S. SELDEN, M. GRISWOLD, Jr. & J. S. CRUMP.
STOVE-PIPE DAMPER.
No. 188,418. Patented March 13, 1877.
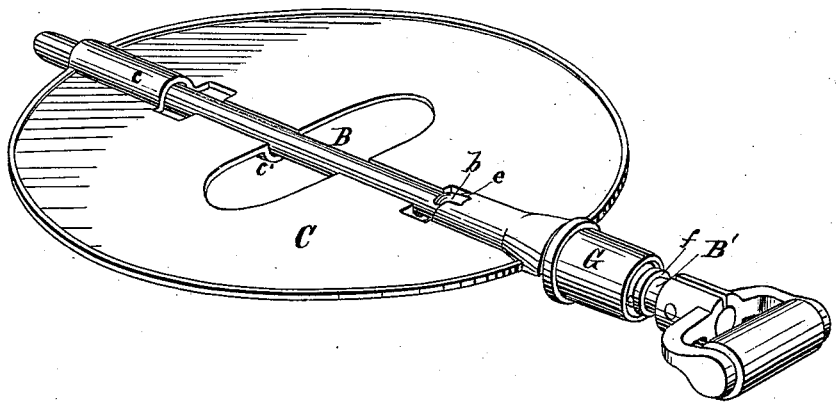
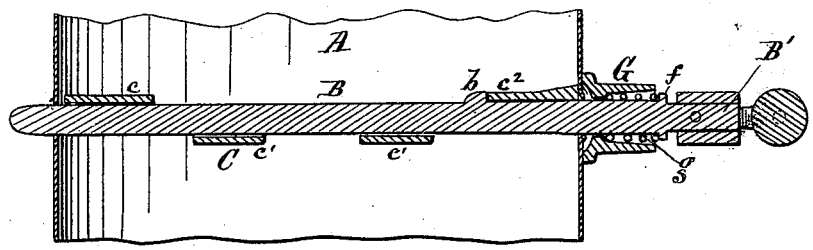

UNITED STATES PATENT OFFICE.

SAMUEL SELDEN AND MATTHEW GRISWOLD, JR., OF ERIE, PENNSYLVANIA, AND JOTHAM S. CRUMP, OF WESTFIELD, NEW YORK, ASSIGNORS TO SELDEN AND GRISWOLD MANUFACTURING COMPANY, OF ERIE, PA.

IMPROVEMENT IN STOVE-PIPE DAMPERS.

Specification forming part of Letters Patent No. 188,418, dated March 13, 1877; application filed February 19, 1877.

*To all whom it may concern:*

Be it known that we, SAMUEL SELDEN and MATTHEW GRISWOLD, Jr., both of the city and county of Erie, State of Pennsylvania, and JOTHAM S. CRUMP, of Westfield, county of Chautauqua, State of New York, have invented certain new and useful Improvements in Stove-Pipe Dampers, of which the following is a full, clear, and exact description, reference being had to the accompanying drawing, making part of this specification, in which—

Figure 1 is a perspective view of our improved damper, and Fig. 2 represents a section through the same, taken in line with the spindle.

Similar letters of reference denote corresponding parts in both figures.

The invention relates to an improvement on the damper on which a patent was granted to Samuel Selden and Matthew Griswold, Jr., dated March 23, 1875, No. 161,064; and consists in a novel means for uniting the damper to the spindle and preventing its rotation thereon, thereby insuring its movement with the spindle when the latter is turned or adjusted, said means serving also to assist in preventing the accidental displacement or rotation of the spindle and damper after the latter have been adjusted or set in the desired position, as hereinafter explained.

In the accompanying drawings, A represents a section of stove-pipe, B the damper-spindle, and C the damper, mounted thereon. The sleeve $c\ c^1\ c^2$ in the damper for receiving the spindle B, instead of being made angular for preventing relative rotation of the parts, as in the patent referred to, is made in semi-cylindrical sections, arranged part on one side of the spindle and part on the opposite side, as shown, the portion $c^2$ adjacent to the handle end of the spindle being notched at its inner end at $e$, to receive a lug or spur, $b$, formed on one side of the round spindle B.

In inserting the spindle it is placed with the spur $b$ opposite to, or turned away from, the semi-cylindrical portion $c^2$ until it has passed by said part of the sleeve, when a half-turn is given to the spindle, bringing the spur into line with the notch $e$, when, by a slight backward movement of the spindle, the spur is made to enter said notch, and to key the damper to the spindle, preventing any relative rotation of one to the other.

The spindle outside of the pipe A has the usual extension or handle part B', with an annular rib or hub, $f$, sleeve G, and inclosed intermediate spring, $g$, surrounding the spindle B, in the manner described in the patent referred to, except that in the present construction the spring performs the additional function of drawing the spur $b$ into the notch $e$ and holding the spindle engaged with the damper.

The outer end of the half-sleeve portion $c^2$, it will be seen, is enlarged, and extends slightly beyond the damper-plate proper, being designed to press against the inner face of the pipe, while the inner enlarged end of sleeve G presses against the outer face thereof, and the two, being drawn together by the action of the spring $g$ and spur $b$, serve to clamp the pipe snugly between them, and thereby to prevent accidental rotation or displacement of the damper. Thus the spur, in addition to the function of preventing relative rotation of the damper and spindle, is made also to assist in preventing the accidental displacement or rotation of the damper within the pipe after it has been adjusted or set as desired.

The relation of the notch $e$ and spur $b$ to the damper and spindle may be reversed, if desired—that is to say, the spur may be formed on the damper or half-sleeve $c^2$, and the notch or socket in the spindle or rear face of the lug $b$—and the same results attained.

Having now described our invention, what we claim as new, and desire to secure by Letters Patent, is—

1. The damper C and spindle B, provided with the spur $b$ and notch or socket $e$, for keying the damper to the spindle, and preventing relative rotation, as described.

2. The spindle B, provided with the lug or spur $b$, in combination with the clamping-sleeves $c^2$ and G, and spring $g$, aranged and operating substantially as described.

SAMUEL SELDEN.
MATTHEW GRISWOLD, JR.
JOTHAM S. CRUMP.

Witnesses:
R. H. HENRY,
S. S. SPENCER.